United States Patent [19]
Kurosawa

[11] Patent Number: 6,005,941
[45] Date of Patent: Dec. 21, 1999

[54] METHOD AND APPARATUS FOR PROVIDING OPTIONAL SERVICE FUNCTIONS IN A PRIVATE BRANCH EXCHANGE

[75] Inventor: Hodaka Kurosawa, Tokyo, Japan

[73] Assignee: Oki Electric, Tokyo, Japan

[21] Appl. No.: 08/857,481

[22] Filed: May 16, 1997

[30] Foreign Application Priority Data

May 24, 1996 [JP] Japan ................................. 8-130265

[51] Int. Cl.⁶ .................................................. H04L 9/00
[52] U.S. Cl. ............................ 380/25; 380/21; 379/198
[58] Field of Search .................................. 379/22, 91.01, 379/91.02, 93.02, 93.03, 114, 189, 198, 201–218; 380/25, 49, 21

[56] References Cited

U.S. PATENT DOCUMENTS

| | | | |
|---|---|---|---|
| 3,931,476 | 1/1976 | Matthews | 379/114 |
| 4,691,346 | 9/1987 | Vanacore | 379/198 |
| 4,747,124 | 5/1988 | Ladd | 379/198 |
| 4,783,796 | 11/1988 | Ladd | 379/212 |
| 5,323,448 | 6/1994 | Biggs et al. | 379/91.02 |
| 5,335,278 | 8/1994 | Matchett et al. | 380/49 |
| 5,455,855 | 10/1995 | Hokari | 379/198 |
| 5,475,740 | 12/1995 | Biggs et al. | 379/91.02 |
| 5,504,810 | 4/1996 | McNair | 379/189 |
| 5,818,904 | 10/1998 | Dean | 379/22 |

FOREIGN PATENT DOCUMENTS

| | | |
|---|---|---|
| 3407215 | 9/1985 | Germany . |
| 181264 | 7/1989 | Japan . |
| 10191 | 1/1992 | Japan . |
| 6334740 | 12/1994 | Japan . |
| 0 420 204 | 4/1991 | United Kingdom . |
| 2253542 | 9/1992 | United Kingdom . |
| 531048 | 3/1993 | United Kingdom . |

*Primary Examiner*—Salvatore Cangialosi
*Attorney, Agent, or Firm*—Venable; Robert J. Frank

[57] ABSTRACT

A private branch exchange has optional service modules for providing optional service functions. The optional service modules are initially disabled, but can be enabled through a telecommunication link, in reply to owner information furnished by the private branch exchange. If the owner information is incorrect, the optional service modules can still be enabled, but the owner information stored in the private branch exchange is altered to leave evidence of the enabling operation. The enabling is carried out by remote authorization equipment according to an authorization key that specifies both the required optional service modules and the owner information. The authorization key is stored on a data medium that can be read only once.

18 Claims, 1 Drawing Sheet

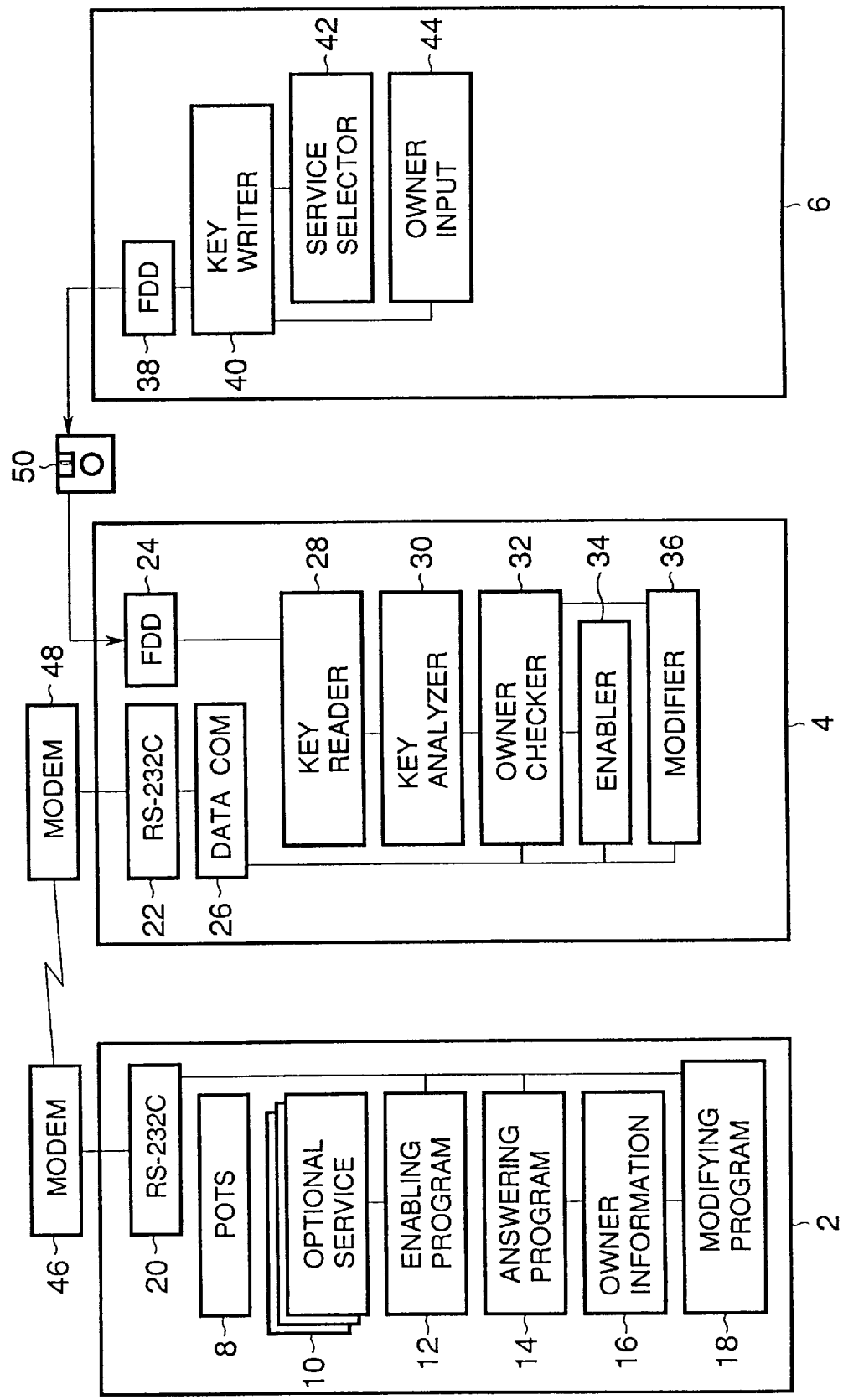

METHOD AND APPARATUS FOR PROVIDING OPTIONAL SERVICE FUNCTIONS IN A PRIVATE BRANCH EXCHANGE

BACKGROUND OF THE INVENTION

The present invention relates to a method and apparatus for providing optional service functions in a privately-owned or leased telephone switching system, referred to below as a private branch exchange or PBX.

A conventional PBX has standard service functions that are built in when the PBX equipment is manufactured, and optional service functions that can be added by loading additional software modules into the PBX. When the PBX owner orders additional optional service functions, a representative of the PBX vendor brings to the owner's site one or more data media on which copies of the required software modules are stored. The data media are read by a device such as a disk drive in the PBX and stored in a non-volatile memory in the PBX, thereby installing the software in the PBX; then the data media are removed and the owner is billed for the additional service functions.

This method of providing optional service functions is slow and inefficient because it requires a separate visit to the PBX owner's site each time optional service functions are added. To add optional service functions to ten different PBX systems, for example, the vendor's representative must visit ten different sites, which may involve considerable travel time and expense.

A further disadvantage of the conventional method of providing optional service functions is that it invites mistakes, such as installing the wrong optional service functions by inserting the wrong data media into the disk drive in the PBX. Such mistakes can moreover be made intentionally, to provide service functions in a way that deprives the PBX vendor of revenues. This unscrupulous practice has been difficult to control, because once a software module is installed in the PBX, there has been no way to tell whether the module was rightfully or wrongfully installed.

An even greater disadvantage of the conventional method is that the data media containing the software modules can be copied using commercially available equipment. Once a copy is made, further copies can be made from the copy, and these copies can be used to provide pirated service functions to an unlimited number of PBX owners. If such copied media come into general circulation, the PBX vendor faces a serious loss of revenue.

SUMMARY OF THE INVENTION

It is accordingly an object of the present invention to provide optional service functions in a PBX promptly and efficiently.

Another object of the invention is to prevent unintended optional service functions from being provided by mistake.

A further object is to prevent optional service functions from being provided unscrupulously.

According to the invented method of providing optional service functions, software modules for the optional service functions are installed in the PBX when the PBX is manufactured, but the use of these optional service modules is initially disabled. The PBX is also provided with an enabling program that can selectively enable the optional service modules, a query answering program that provides owner information stored in a memory unit in the PBX, and a modifying program that can modify the stored owner information.

The PBX is purchased from a vendor who has apparatus for producing authorization keys, and is serviced by a dealer who has authorization apparatus for authorizing optional service functions. The authorization apparatus reads data media prepared by the vendor's apparatus, and communicates with the enabling program and query answering program in the PBX through a telecommunication link.

When the PBX owner orders additional optional service functions, the PBX vendor selects the software modules needed for these service functions, combines information designating the selected software modules and information identifying the PBX owner into an authorization key, and writes the authorization key on a data medium that can be read only once. The data medium is brought to the dealer's site and read by the dealer's authorization apparatus. Software in the authorization apparatus analyzes the authorization key, then interrogates the query answering program in the PBX through the telecommunication link, receives the owner information sent by the query answering program, and compares that owner information with the owner information given in the authorization key. If the owner information matches, then enabling information is sent from the authorization apparatus through the telecommunication link, causing the enabling program in the PBX to enable the software modules designated in the authorization key.

If the owner information does not match, the person operating the authorization apparatus is notified. That person can choose to terminate or continue the authorization operation. If the operation is continued, software in the authorization apparatus sends enabling information through the telecommunication link, causing the enabling program in the PBX to enable the selected software modules, and also sends modification information causing the modifying program to modify the owner information stored in the PBX. The modified owner information appears on service documentation produced subsequently by the PBX.

The invented method is quick and efficient, because optional service functions can be provided from the dealer's premises via telecommunications links, without requiring visits to the PBX owners' sites.

Provision of optional service functions by mistake is prevented by the checking of owner information encoded in the authorization key.

Unscrupulous practices are prevented because the data medium containing the authorization key can be used only once. Unscrupulous practices are further prevented by the alteration of owner information in the PBX, which leaves detectable evidence if service functions are provided to a PBX owner other than the owner identified in the authorization key.

BRIEF DESCRIPTION OF THE DRAWINGS

FIGURE is a block diagram of an embodiment of the invention.

DETAILED DESCRIPTION OF THE INVENTION

An embodiment of the invented method of providing optional service functions will be described below with reference to the attached drawing.

Referring to FIGURE, the invented method involves three major components: a PBX 2, authorization apparatus 4, and authorization key preparation apparatus 6. The PBX 2 is owned or leased by an entity such as a company or organization, referred to below as the PBX owner or simply 'owner,' and is installed on the owner's premises. The authorization apparatus 4 is installed on the premises of a dealer through whom the PBX 2 may have been purchased or leased, and who provides maintenance service for the PBX 2. The authorization key preparation apparatus 6 is operated by the vendor of the PBX 2, who may also be the manufacturer of the PBX, and is installed on the vendor's premises.

A detailed description of the well-known PBX hardware configuration will not be given here. The following description will focus on the software stored in the memory of the PBX 2. This memory comprises, for example, non-volatile semiconductor memory devices which provide a number of memory units for storing different types of software.

One memory unit stores a standard service software module 8 for providing standard telephone service functions such as originating and answering calls. These functions are sometimes referred to as plain old telephone service or POTS.

Another memory unit stores a plurality of software modules 10 for providing optional service functions such as call waiting and call forwarding. These software modules 10 are installed when the PBX 2 is manufactured, but they can be selectively enabled and disabled. Software modules 10 for optional service functions that the PBX owner requests and pays for are enabled; other software modules 10 are disabled.

Another memory unit stores an enabling program 12 that can change optional service modules 10 from the disabled state to the enabled state in response to information received through a telecommunication link. Another memory unit stores a query answering program 14 that provides owner information 16, identifying the PBX owner, through the same telecommunication link. The owner information 16 is stored in yet another memory unit. Still another memory unit stores a modifying program 18 that can modify the stored owner information 16, responsive to information received through the telecommunication link.

The telecommunication link in this embodiment is a serial data link that operates through a serial data interface circuit 20 in the PBX 2. The interface circuit 20 may be a standard circuit conforming to the well-known RS-232C specification, for example, as indicated in the drawing.

The authorization apparatus 4 has a similar serial (e.g. RS-232C) interface circuit 22, and also has a disk drive 24 for reading and writing data on magnetic-disk data media. These magnetic disk media are thin flexible disks sometimes referred to as floppy disks, and the disk drive 24 is commonly referred to as a floppy disk drive (FDD).

The authorization apparatus 4 also has various memory units storing different types of software. One memory unit stores a data communication program 26 that communicates with the outside world through the interface circuit 22. Another memory unit stores a key reader program 28 that reads data from disk media mounted in the disk drive 24. Another memory unit stores a key analyzer program 30 that analyzes the data read by the key reader program 28, thereby deriving selection information and owner information. Still another memory unit stores an owner checker program 32 that checks the owner information. An enabler program 34 and a modifier program 36, which are stored in two further memory units, operate according to results obtained by the owner checker program 32.

The authorization key preparation apparatus 6 has a disk drive 38 similar to the disk drive 24 in the authorization apparatus 4, and memory units storing a key writer program 40, a service selector program 42, and an owner information input program 44. The key writer program 40 assembles information received from the service selector program 42 and owner information input program 44 into an authorization key, and writes the authorization key on a disk medium mounted in the disk drive 38.

The telecommunication link referred to above links the PBX 2 to the authorization apparatus 4. The telecommunication link is created by a pair of modulator-demodulator devices 46 and 48, commonly referred to as modems, which are coupled to respective interface circuits 20 and 22 and communicate through a public telephone network.

The memory units storing different types of software in the PBX 2 need not be physically separate units, but may comprise different areas in a single memory device. The same applies to the memory units in the authorization apparatus 4 and authorization key preparation apparatus 6.

Next, the operation of this embodiment will be described.

When the PBX 2 is shipped from the vendor to the prospective PBX owner, optional service modules 10 are enabled according to the service functions ordered by the prospective owner. Later, the owner may require additional service functions. In this case, the owner negotiates with the dealer, who sends a request to the vendor.

At the vendor's site, a human operator uses the authorization key preparation apparatus 6 to process the request. The service selector program 42 displays, for example, a list of the optional service modules 10 installed in the PBX 2, from which the operator selects the modules needed for the additional service functions requested by the PBX owner. The service selector program 42 responds by providing corresponding selection information, designating the selected optional service modules 10, to the key writer program 40. The owner information input program 44 displays, for example, an input screen on which the operator can enter owner information identifying the PBX owner. The owner information input program 44 provides the owner information to the key writer program 40.

The key writer program 40 uses the provided selection information and owner information to generate an authorization key. The authorization key is preferably encrypted by well-known methods that make the authorization key indecipherable without the possession of a certain cryptographic key, which is held by the key analyzer program 30 in the authorization apparatus 4. The key writer program 40 then writes the authorization key on a disk medium 50 mounted in the disk drive 38, preferably in a non-standard format that can be read by the disk drive 24 in the authorization apparatus 4 but not by disk drives installed in commercially available computers or other data-processing equipment.

The disk medium 50 is then taken from the vendor's site to the dealer's site and mounted in the disk drive 24. The key reader program 28 reads the authorization key from the disk medium 50, and writes information on the disk medium 50 that prevents the authorization key from being read again. For example, the key reader program 28 can write a special code designating the disk medium 50 as having been read, in which case the key reader program 28 refuses to read disk media that are marked with this code. Alternatively, the key reader program 28 can erase the authorization key from the key reader program 28 by overwriting the authorization key with other data.

The key analyzer program 30 analyzes the authorization key read by the key reader program 28 to obtain the selection information and owner information encoded therein, and provides the owner information to the owner checker program 32. The owner checker program 32 interrogates the query answering program 14 in the PBX 2 through the telecommunication link: specifically, through the data communication program 26, interface circuit 22, modem 48, public telephone network, modem 46, and interface circuit 20. The query answering program 14 replies by sending the owner information 16 stored in the PBX 2. The owner checker program 32 compares the owner information received from the PBX 2 with the owner information from the authorization key. If the owner information received from the PBX 2 matches the owner information given in the authorization key, the owner checker program 32 activates the enabler program 34.

The enabler program 34 receives the selection information obtained by the key analyzer program 30, and prepares enabling information designating the optional software modules that were specified by the selection information. The enabling information is preferably encrypted with an encryption key that makes the enabling information decipherable only by the enabling program 12 in the PBX 2. For further security, the enabling information may include the owner information. The data communication program 26 sends the prepared enabling information to the PBX 2. The enabling program 12 deciphers the enabling information and enables the use of the optional service modules 10 designated in the enabling information, thus providing the requested service functions to the PBX owner.

If the owner information received from the PBX 2 does not match the owner information given in the authorization key, the owner checker program 32 issues a prompt to a human operator at the dealer's site. The human operator replies by choosing either to terminate or to continue the service authorization operation. If the operator chooses to terminate the operation, the telecommunication link between the authorization apparatus 4 and PBX 2 is disconnected. The operator chooses to terminate the operation if, for example, the wrong disk medium was mounted by mistake in the disk drive 24. Provision of unintended service functions to the wrong PBX through human error can thereby be prevented.

If the operator chooses to continue the operation, the owner checker program 32 activates both the enabler program 34 and the modifier program 36. The enabler program 34 prepares enabling information as before, which is transmitted by the data communication program 26 to the PBX 2 and causes the enabling program 12 to enable the designated optional service modules 10. The modifier program 36 generates encrypted modification information, which is also transmitted by the data communication program 26, and causes the modifying program 18 to modify the owner information 16 stored in the PBX 2. For example, the modifying program 18 may change the owner information 16 to include both the owner information 16 originally stored in the PBX 2 and the owner information given in the authorization key, and may add a notice indicating that the owner information has been changed and giving the time and date of the change.

The operator at the dealer's site may choose to continue the authorization operation if the operator at the vendor's site made a mistake in entering the owner information, for example. The operator may also choose to continue the operation if the owner information 16 stored in the PBX 2 has been corrupted through a malfunction in the PBX 2, or when it is necessary to recover from various other abnormal situations. Service functions provided in this way will soon come to the dealer's and vendor's attention, however, because the modified owner information 16 appears on service documentation that is generated by the PBX 2 and seen by the dealer and vendor. The vendor will therefore be able to claim rightful revenues for the service functions provided.

Various other safeguards are built into the first embodiment. The disk medium 50 cannot be copied on commercially available equipment because of its special format. Without being copied, the disk medium 50 cannot be used to provide service functions to more than one PBX, because the disk medium 50 can be read only once by the authorization apparatus 4. Use of the same disk medium 50 to provide services to more than one PBX owner is therefore prevented.

Even if someone succeeds in copying the disk medium 50 by means of special equipment, or succeeds in reading the disk medium 50 more than once, the authorization key written on the disk medium 50 contains owner information that prevents the authorization key from being used to provide optional service functions to other PBX owners indiscriminately. Moreover, the authorization key can be encrypted in a way that makes the authorization key indecipherable, except by the key analyzer program 30 in the authorization apparatus 4, and possession of the encryption key needed for generating authorization keys can easily be restricted to the key writer program 40 in the authorization key preparation apparatus 6.

The invented method of providing optional service functions is accordingly much more resistant to human error and unscrupulous practices than is the conventional method. The invented method is also more efficient, because disk media only have to be transported from the vendor's site to the dealer's site; they do not have to be taken to widely scattered PBX owners' sites.

The embodiment described above can be modified in various ways. Data media other than thin flexible disks may be used. The telecommunication link between the PBX 2 and authorization apparatus 4 may be any type of telecommunication link, not necessarily one employing RS-232C interface circuits and modems. Encryption and decryption may be handled by the data communication program 26 in the authorization apparatus 4 and by a similar communication program in the PBX 2, instead of by the enabler program 34, modifier program 36, enabling program 12, and modifying program 18.

Those skilled in the art will recognize that further modifications are possible within the scope of the invention as claimed below.

What is claimed is:

1. A method of providing optional service functions in a private branch exchange having internally stored first owner information identifying an owner of said private branch exchange, comprising the steps of:

installing in said private branch exchange, when said private branch exchange is manufactured, disabled software modules for providing said optional service functions;

generating an authorization key designating selected modules among said software modules, said authorization key also specifying second owner information identifying the owner of said private branch exchange;

writing said authorization key on a data medium;

reading said authorization key from said data medium;

disabling further reading of said data medium;

interrogating said private branch exchange through a telecommunication link;

receiving said first owner information from said private branch exchange through said telecommunication link;

comparing the first owner information received from said private branch exchange with the second owner information specified in said authorization key;

sending said private branch exchange, through said telecommunication link, enabling information causing said private branch exchange to enable said selected modules, if said first owner information matches said second owner information; and sending said enabling information together with modification information through said telecommunication link, said modification information causing said private branch exchange to alter said internally stored first owner information, if said first owner information does not match said second owner information.

2. The method of claim 1, wherein said steps of generating an authorization key and writing said authorization key are performed by a vendor of said private branch exchange.

3. The method of claim 2, wherein said steps of reading, disabling, interrogating, receiving, comparing, and sending are performed by authorization apparatus designed specifically for performing these steps.

4. The method of claim 3, wherein said data medium is formatted to be readable by said authorization apparatus but not to be readable by commercially available data-processing equipment.

5. The method of claim 3, wherein said authorization apparatus is operated by a dealer who acts as an intermediary between said vendor and the owner of said private branch exchange.

6. The method of claim 5, wherein said step of sending said enabling information together with modification information is performed at the dealer's discretion, said dealer being able to choose not to send said enabling information if said first owner information does not match said second owner information.

7. A private branch exchange, comprising:
a first memory unit storing a plurality of optional service modules capable of being selectively enabled and disabled;

a second memory unit storing an enabling program for selectively enabling said optional service modules, responsive to enabling information received through a telecommunication link;

a third memory unit storing owner information identifying an owner of said private branch exchange;

a fourth memory unit storing a query answering program for providing said owner information through said telecommunication link; and a fifth memory unit storing a modifying program for modifying the owner information stored in said third memory unit, responsive to modification information received through said telecommunication link.

8. The private branch exchange of claim 7, wherein the owner information stored in said third memory unit is also printed in service documentation prepared by said private branch exchange.

9. The private branch exchange of claim 7, wherein said enabling information is encrypted.

10. The private branch exchange of claim 7, wherein said modification information is encrypted.

11. An authorization apparatus for authorizing use of optional service functions provided by optional service modules in a private branch exchange, comprising:
a first memory unit storing a key reader program for reading an authorization key from a data medium, and disabling further reading of said data medium;

a second memory unit storing a key analyzer program for analyzing said authorization key and deriving therefrom owner information and selection information, said selection information designating certain optional service modules among the optional service modules in said private branch exchange;

a third memory unit storing an owner checker program for interrogating said private branch exchange through a telecommunication link, receiving owner information stored in said private branch exchange, and comparing the owner information received from said private branch exchange with the owner information derived from said authorization key;

a fourth memory unit storing an enabler program for sending said private branch exchange, through said telecommunication link, enabling information responsive to said selection information, causing said private branch exchange to enable the optional service modules designated by said selection information; and a fifth memory unit storing a modifier program for sending said private branch exchange, through said telecommunication link, modification information causing said private branch exchange to modify the owner information stored in said private branch exchange, when the owner information received from said private branch exchange does not match the owner information derived from said authorization key but said enabler program still sends said enabling information to said private branch exchange.

12. The authorization apparatus of claim 11 wherein, when the owner information received from said private branch exchange does not match the owner information specified in said authorization key, said owner checker program issues a prompt to a human operator, and said enabler program sends said enabling information to said private branch exchange only if said human operator gives a certain response to said prompt.

13. The authorization apparatus of claim 11, wherein said authorization key is encrypted.

14. The authorization apparatus of claim 11, wherein said enabling information is encrypted.

15. The authorization apparatus of claim 11, wherein said modification information is encrypted.

16. Authorization key preparation apparatus for producing an authorization key authorizing the use of optional service functions installed in a private branch exchange, comprising:
a first memory unit storing a service selector program for generating selection information designating a set of optional service modules providing optional service functions requested by an owner of said private branch exchange;

a second memory unit storing an owner information input program for receiving input of owner information identifying the owner of said private branch exchange; and a third memory unit storing a key writer program for combining said selection information and said owner information into an authorization key, and writing said authorization key on a data medium.

17. The authorization key producing apparatus of claim 16, wherein said data medium is readable only once.

18. The authorization key producing apparatus of claim 16, wherein said key writer program encrypts said authorization key.

* * * * *